(12) United States Patent
Waldner

(10) Patent No.: US 10,093,150 B2
(45) Date of Patent: Oct. 9, 2018

(54) PRESSURIZATION SYSTEM AND KIT FOR PRESSURIZING PICKUP TRUCK BED CLOSED AT ITS TOP BY A COVER

(71) Applicant: Maple Grove Plastics Inc., Lauder (CA)

(72) Inventor: Randy Waldner, Lauder (CA)

(73) Assignee: Maple Grove Plastics Inc., Lauder (CA)

( * ) Notice: Subject to any disclaimer, the term of this patent is extended or adjusted under 35 U.S.C. 154(b) by 0 days.

(21) Appl. No.: 15/626,685

(22) Filed: Jun. 19, 2017

(65) Prior Publication Data

US 2018/0072132 A1    Mar. 15, 2018

(30) Foreign Application Priority Data

Sep. 9, 2016   (CA) .................................... 2941299

(51) Int. Cl.
| | | |
|---|---|---|
| *B60H 1/00* | (2006.01) | |
| *B60H 1/24* | (2006.01) | |
| *B60H 1/26* | (2006.01) | |
| *B60J 7/10* | (2006.01) | |

(52) U.S. Cl.
CPC ......... *B60H 1/00564* (2013.01); *B60H 1/244* (2013.01); *B60H 1/26* (2013.01); *B60J 7/10* (2013.01)

(58) Field of Classification Search
CPC ....... B60H 1/00564; B60H 1/244; B60H 1/26
USPC .......................... 296/166, 183.1, 208; 454/70
See application file for complete search history.

(56) References Cited

U.S. PATENT DOCUMENTS

| | | | | |
|---|---|---|---|---|
| 3,638,991 A | * | 2/1972 | Hathaway, Jr. ........... | B60P 3/36 105/18 |
| 3,840,263 A | * | 10/1974 | Bowden ................... | B60N 2/00 296/10 |
| 4,157,201 A | * | 6/1979 | Collins .................... | B60P 3/423 296/156 |
| 4,172,494 A | * | 10/1979 | Saulters ............. | B60H 1/00564 165/43 |
| 4,222,605 A | * | 9/1980 | Engelhard ................. | B60P 3/32 105/18 |
| 4,492,384 A | * | 1/1985 | Herschelman ......... | B60D 5/006 277/636 |
| 4,616,871 A | * | 10/1986 | Pettit ........................ | B60P 3/32 160/105 |
| 4,671,560 A | * | 6/1987 | Pettit ........................ | B60P 3/32 296/166 |
| 4,848,832 A | * | 7/1989 | Starnes ..................... | B60P 3/32 296/155 |
| 4,940,278 A | * | 7/1990 | Lepere ..................... | B60P 3/32 296/166 |
| 5,067,769 A | * | 11/1991 | Benchoff ................. | B60P 3/32 296/166 |

(Continued)

*Primary Examiner* — Jason S Morrow
(74) *Attorney, Agent, or Firm* — Adrian D. Battison; Ade + Company Inc; Ryan W. Dupuis

(57) ABSTRACT

A pressurization system for pressurizing a covered bed of a pickup truck features an opening in the truck bed closed by a perforated grill and a duct extending from a vent at a rear of the cabin to the opening in the bed. The vent at the rear of the cabin communicates an inside of the cabin with an outside so that air inside is discharged to the outside. As such, the duct is disposed externally of the cabin and thus conveys to the covered bed the air which is discharged from the cabin through the vent.

20 Claims, 7 Drawing Sheets

(56) References Cited

U.S. PATENT DOCUMENTS

| | | | | |
|---|---|---|---|---|
| 5,280,984 A * | 1/1994 | Paul | ............... | B60D 5/006 296/1.06 |
| 5,437,492 A * | 8/1995 | Pascoe | ............... | B60P 3/36 296/156 |
| 5,924,762 A * | 7/1999 | Pols | ............... | B60P 3/36 296/166 |
| 6,062,975 A * | 5/2000 | Knudtson | ............... | B60H 1/00014 454/112 |
| 7,014,251 B1 * | 3/2006 | Husk | ............... | B60J 1/1853 277/630 |
| 7,111,896 B1 * | 9/2006 | Arriola, Sr. | ............... | B60D 5/006 296/152 |
| 2002/0021025 A1 * | 2/2002 | Lukomskiy | ............... | B60P 3/40 296/190.11 |

* cited by examiner

PRESSURIZATION SYSTEM AND KIT FOR PRESSURIZING PICKUP TRUCK BED CLOSED AT ITS TOP BY A COVER

This applications claims the benefit of Canadian patent application 2,941,299 filed Sep. 9, 2016.

FIELD OF THE INVENTION

The present invention relates to pressurization of a truck bed of a pickup truck, which is closed by a cover so as to form an enclosed container at the truck bed, so as to reduce inadvertent entry of dust and debris into the enclosed container during transport.

BACKGROUND

It is common practice to close an open top of a truck bed of a pickup truck with a cover such as a camper shell (also referred to in industry as a cap) or a tonneau cover, for example that which is a single solid body (commonly made of fibreglass) spanning the length of the bed and which is liftable in pivotal motion about its end at a front wall of the bed or that which comprises a plurality of panels each pivotal relative to the next so that the cover is foldable to uncover a portion of the bed while a remainder of the bed remains covered or that which comprises a rollable canvas or fabric material.

Each cover is contiguous with the truck bed at a plurality of seams about the bed where the cover meets the bed at or adjacent top edges thereof. Typically, a seal between the cover and the truck bed at these seams is substantially airtight so that air is inhibited from passing therethrough. However, there exist openings and corresponding passageways in the truck bed including at existing seams between adjacent walls of the truck bed and between the respective wall and the floor, as well as openings in the bed which are used for example for tying down contents stored in the bed or for water drainage from the bed, and thus even though the bed is coveredair is able to pass from an outside to an inside of the covered bed through the existing openings and passageways in the bed. Passage of air at the existing seams and openings/passageways, particularly in a direction into the bed, is exacerbated during transport when the truck is moving such that ambient air is drawn into the covered truck bed. As such, when travelling down dusty roads, dust is drawn into the bed along with the ambient air thus causing an inside of the truck bed and any contents therein to be covered with dust. This is a common problem known to pickup truck drivers who travel down unpaved roads having for example a gravel or dirt surface.

The Applicant has developed a solution by which dust and other particulate debris is inhibited from passing into the covered truck bed during transport.

SUMMARY OF THE INVENTION

According to an aspect of the invention there is provided a pickup truck comprising:

a frame having front and rear ends that is arranged for rolling movement across a support surface;

a cabin arranged for housing occupants that is supported on the frame;

a ventilator unit feeding an interior of the cabin with forced air;

the cabin including a vent at a rear of the cabin by which the interior of the cabin is communicated with an exterior of the cabin so that the forced air inside the cabin is permitted to discharge from the cabin to the exterior thereof;

a truck bed supported on the frame rearwardly of the cabin with a front wall at a front end of the bed, rear wall at a rear end of the bed, and side walls spanning therebetween on either side of the bed;

a cover spanning between the front wall, the side walls, and the rear wall so as to close a top of the truck bed thus defining an enclosed container at the truck bed;

the truck bed having existing openings through which ambient air is able to pass into the enclosed container;

a pressurization system for pressurizing the enclosed container so as to prevent passage of the ambient air into the enclosed container comprising:

an opening in the bed;

a duct disposed externally of the cabin extending from the vent in the rear of the cabin to the opening in the bed for guiding the air discharged from the cabin through the vent into the enclosed container.

Therefore, the truck bed is pressurized using the air stream fed into the cabin by the ventilator unit that is then ducted from the cabin at the discharge vents to the truck bed which is covered and closed. This may alleviate a pressure gradient which is otherwise present between an outside and an inside of the covered truck bed that typically causes particulate debris, such as dust, to be drawn into the truck bed at the existing openings in the bed. These existing openings in the bed include existing seams between adjacent walls of the truck bed, for example a seam between one of the side walls and the pivotal rear wall, and openings in the bed which are used for tying down contents stored in the bed or for water drainage from the bed.

Preferably a perforated grill closes the opening in the bed.

Typically the duct is disposed between the rear of the cabin and the front wall of the bed where the opening in the bed is located.

Typically the opening of the bed is located in the front wall thereof in a manner corresponding with location of the vent in the rear of the cabin such that the duct extends linearly rearwardly from the vent to the bed opening.

Preferably the duct comprises compressible material extending from a position at the rear of the cabin towards the front wall of the bed so as to maintain communication with the vent during movement of the bed relative to the cabin. As the truck bed and cabin are not affixed to one another, such relative movement is typically observed during transport when travelling over an uneven surface. Further, this compressible material from which the duct is made is preferably resilient so that the duct can withstand the movement between the bed and cabin but also return thereafter to its substantially uncompressed state in which the duct is when the truck is for example at rest.

The duct may comprise thermally insulating material. An example of such material is foam.

In one arrangement the duct comprises a first face with an opening communicating a passageway of the duct with the vent of the cabin and a second face with an opening communicating the passageway with the opening in the bed, the first face of the duct being in butting engagement with an outer surface of the cabin and the second face being in butting engagement with an outer surface of the bed.

In one arrangement the grill includes a screen locating perforations of the grill and a rim supported on the screen that locates the duct in position between the vent in the rear of the cabin and the opening in the bed.

In one arrangement the rim has a peripheral outer face and a peripheral inner face which co-terminate at a distal end of the rim that is spaced from the screen, and the duct is received at the outer face of the rim.

In one arrangement the duct is supported in fixed relation to the bed with an end portion of the duct in butting engagement with the rear of the cabin so as to maintain communication with the vent during movement of the bed relative to the cabin.

The grill may include a plurality of elongated ridges each which project transversely from a face of the grill that is exposed at an inside of the bed so as to resist obstruction of perforations of the grill by contents in the bed Preferably the vent in the rear cabin is enclosed around its periphery by an open end of the duct. Therefore all discharged air passing through the vent is guided into the truck bed.

According to an aspect of the invention there is provided a kit for pressurizing a bed of a pickup truck that is closed with a cover, the pickup truck including:

a frame having front and rear ends that is arranged for rolling movement across a support surface;

a cabin arranged for housing occupants that is supported on the frame rearwardly of the compartment;

a ventilator unit feeding an interior of the cabin with forced air;

the cabin including a vent at a rear of the cabin by which the interior of the cabin is communicated with an exterior of the cabin so that the forced air inside the cabin is permitted to discharge from the cabin to the exterior thereof;

the truck bed supported on the frame rearwardly of the cabin with a front wall at a front end of the bed, rear wall at a rear end of the bed, and side walls spanning therebetween on either side of the bed;

a cover spanning between the front wall, the side walls, and the rear wall so as to close a top of the truck bed thus defining an enclosed container at the truck bed;

the truck bed having existing openings through which ambient air is able to pass into the enclosed container;

the kit comprising:

a duct to be located externally of the cabin arranged to extend from the vent in the rear of the cabin to an opening formed in the bed for guiding the air discharged from the cabin through the vent into the enclosed container;

whereby the enclosed container is pressurized by the air discharged from the cabin such that ambient air is prevented from passing into the enclosed container.

Thus an existing truck can be retrofitted or modified in a manner installing the kit for pressurizing the truck bed when covered.

Preferably the kit includes a perforated grill arranged to close the opening formed in the bed.

Typically the duct is arranged to be disposed between the rear of the cabin and the front wall of the bed where the opening in the bed is located.

Typically the duct is arranged to extend linearly rearwardly to the opening which is formed in the bed at a location corresponding to that of the vent in the rear of the cabin.

Preferably the duct comprises compressible material arranged to extend from a position at the rear of the cabin towards the front wall of the bed.

The duct may comprise thermally insulating material.

In one arrangement the duct comprises a first face with an opening arranged for communicating a passageway of the duct with the vent of the cabin and a second face with an opening arranged for communicating the passageway with the opening in the bed, the first face of the duct being arranged for butting engagement with an outer surface of the cabin and the second face being for butting engagement with an outer surface of the bed.

In one arrangement the grill includes a screen locating perforations of the grill and a rim supported on the screen that locates the duct in position between the vent in the rear of the cabin and the opening formed in the bed.

In one arrangement the rim has a peripheral outer face and a peripheral inner face which co-terminate at a distal end of the rim that is spaced from the screen, and the duct is arranged to be received at the outer face of the rim.

In one arrangement the duct comprises a first portion arranged to be held in fixed relation to the opening in the bed and a second portion which is movable relative to the first portion such that the passageway of the duct is adjustable in length between the opening in the bed and the vent at the rear of the cabin, and the second portion at its end distal to the first portion supporting a compressible seal arranged for butting engagement with the rear of the cabin.

In one arrangement the duct comprises a first portion coupled fixedly to the grill and a second portion which is movable relative to the first portion such that the passageway of the duct is adjustable in length between the grill and the vent at the rear of the cabin, and the second portion at its end distal to the first portion supporting a compressible seal arranged for butting engagement with the rear of the cabin.

The grill may include a plurality of elongated ridges each which project transversely from a face of the grill that is arranged to be exposed at an inside of the bed so as to resist obstruction of perforations of the grill by contents in the bed.

Preferably an open end of the duct positionable at the cabin is arranged to enclose the vent in the rear of the cabin around a periphery of the vent.

BRIEF DESCRIPTION OF THE DRAWINGS

Preferred arrangements of the invention will now be described in conjunction with the accompanying drawings in which.

DETAILED DESCRIPTION

Figure 1:
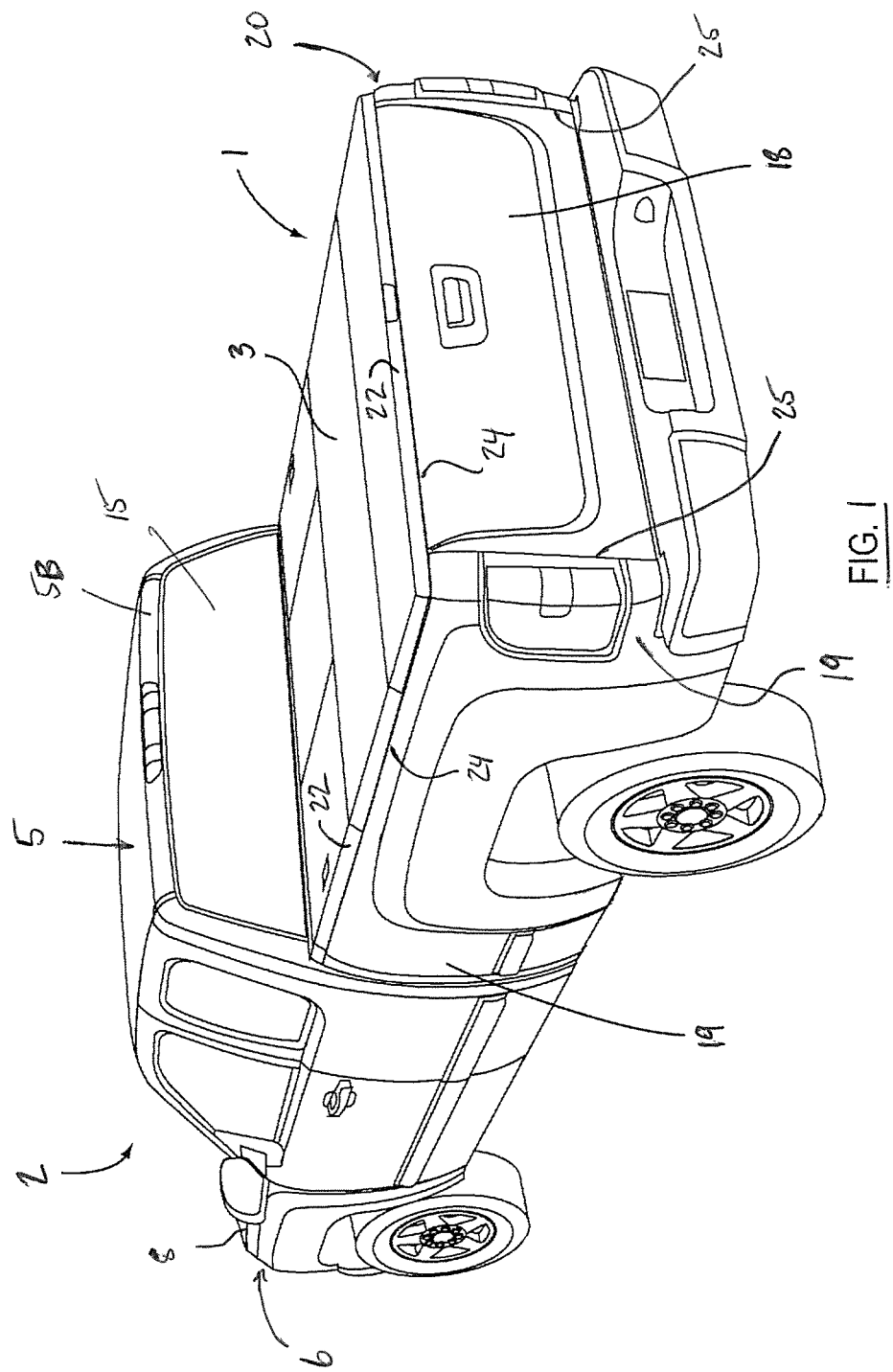
FIG. 1 is a perspective view of pickup truck with truck bed cover in conjunction with which a pressurization system according to the present invention is implementable.

There is shown in the accompanying figures a pressurization system generally indicated at reference numeral 100 for pressurizing a bed 1 of a pickup truck 2 that is closed with a cover 3. The pressurization system 100 may be included at time of fabrication of the pickup truck by the original manufacturer, such that the system 100 is considered an original component of the truck, or the system may be formed by a kit of parts allowing an existing pickup truck to be retrofitted in order to include same.

The conventional pickup truck 2 comprises a frame 4 (schematically shown) with front and rear ends 4A and 4B that is arranged. The frame is arranged for rolling movement across a support surface such as a roadway (paved or unpaved) and thus includes wheels. On the frame there is supported a cabin 5 of the pickup truck, sometimes also referred to as a cab, which houses occupants of the vehicle. The cabin 5 is located closer to the front end 4A than the rear end of the frame with an openable compartment 6 immediately in front of the cabin so as to be at the front end of the frame.

The compartment 6 is accessible via a hood 8 and substantially houses a number of major operational systems of the truck including a powertrain system 10 comprising an engine of the truck and a HVAC system 12 comprising a ventilator unit 13 which feeds forced air into the cabin. Typically the ventilator unit conditions ambient air drawn in by the HVAC system, including heating or cooling the air, and generates a stream of the air which is fed to an interior of the cabin.

Further, the cabin 5 includes at least one vent 14 at a rear of the cabin, typically in an area of a rear cabin wall 5B below a rear window 15, by which the interior I of the cabin is communicated with an exterior E of the cabin so that the forced air inside the cabin 5, that is fed therein by the ventilator unit 13, and moreover any air which is inside the cabin is permitted to discharge from the cabin to the exterior thereof. Thus, typically once the forced air has circulated about the interior or inside of the cabin it then passes through the vent 14 to the outside of the cabin.

Figure 2:
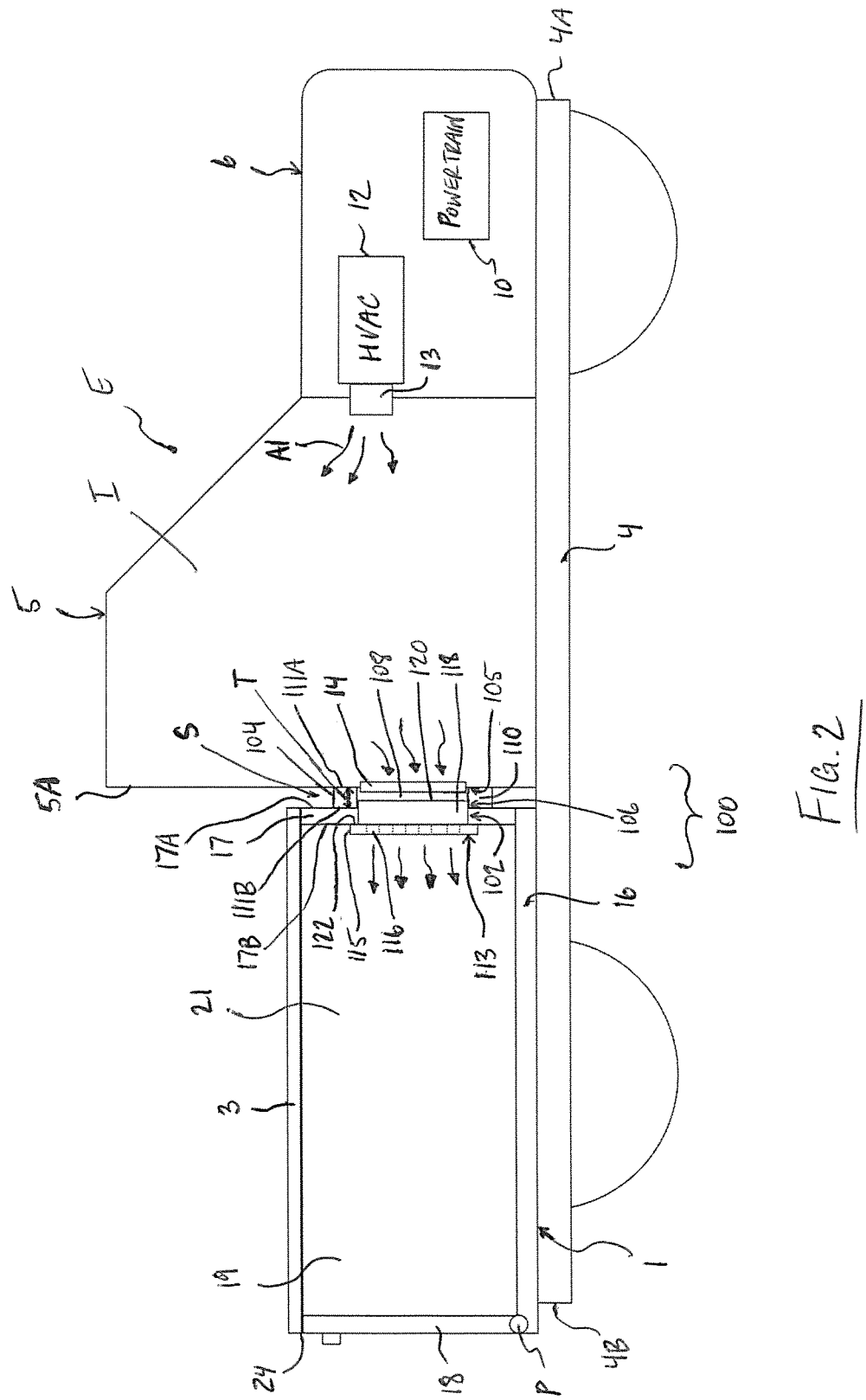
FIG. 2 illustrates the pickup truck with the cover, like that shown in FIG. 1, in vertical cross-section including a pressurization system of a first arrangement according to the present invention. Some components are illustrated schematically and others are omitted for clarity of illustration.
Figure 3:
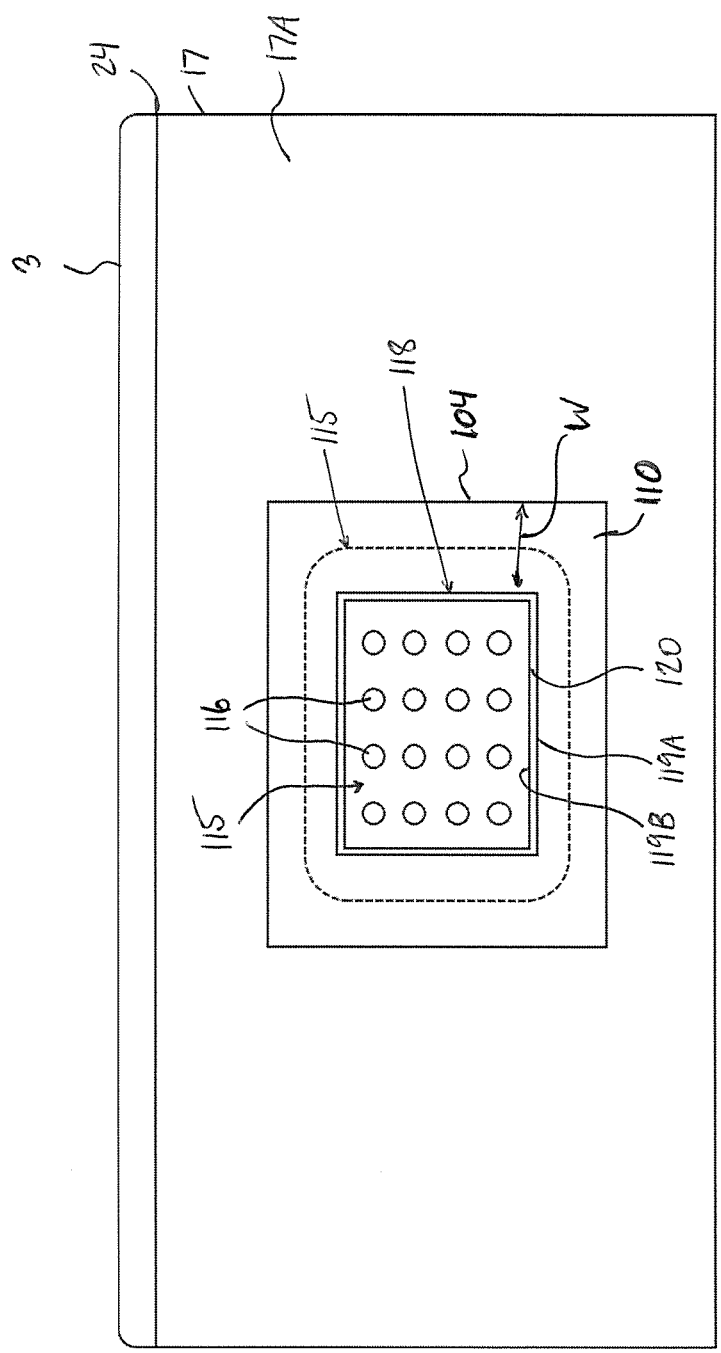
FIG. 3 illustrates in elevational view from an outside of a pickup truck bed a front wall of the truck bed with pressurization system according to the present invention.
Figure 4:
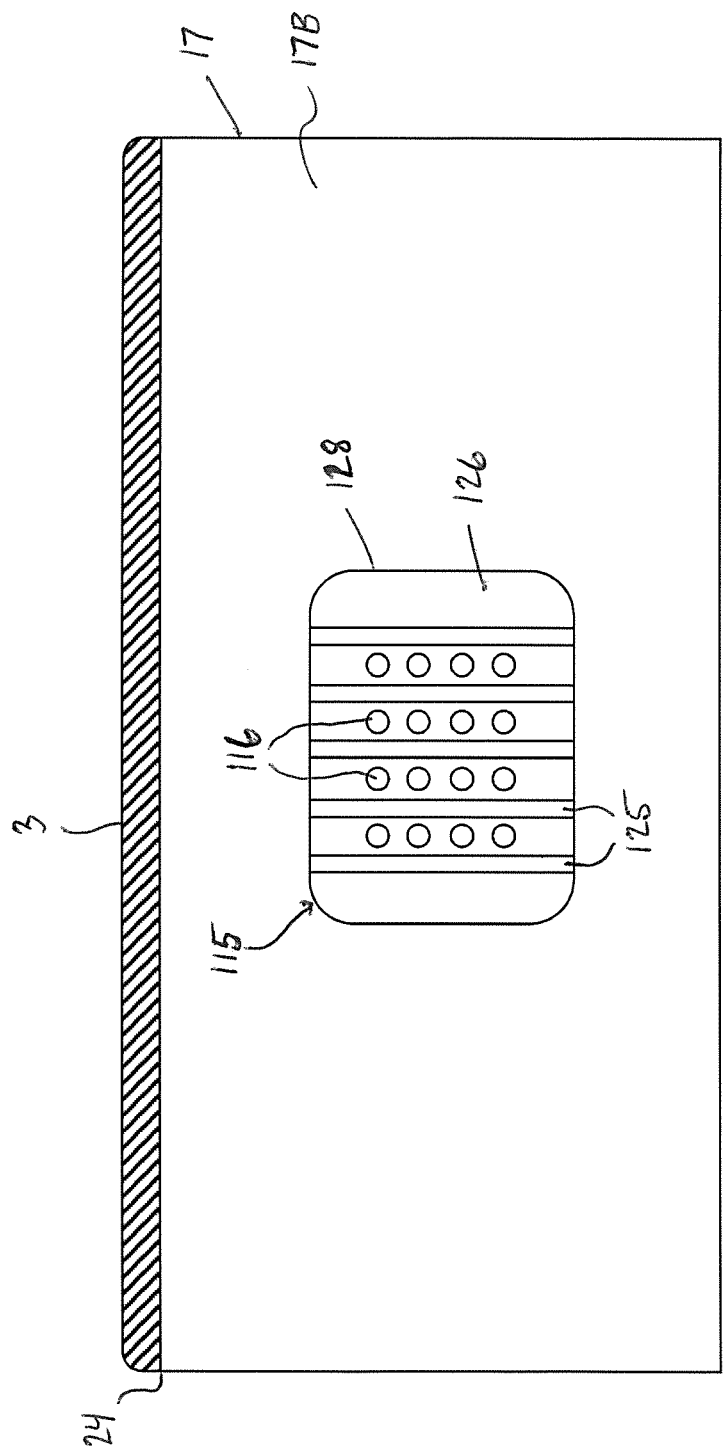
FIG. 4 is an elevational view of the front wall of the truck bed similar to that shown in FIG. 3 but from an inside of the truck bed.

As mentioned earlier, the pickup truck 2 includes the bed 1 which is located rearwardly of the cabin 5. The bed 1 comprises a bottom floor 16, a front wall 17 standing upwardly therefrom at a front end of the bed, a rear wall 18 at a rear end of the bed that is pivotally movable about point P between an upstanding position (for example shown in FIG. 2) and a laid-down position in which the rear wall is generally coplanar with the bottom floor 16 of the bed. The bed further includes side walls 19 and 20 spanning from the front wall to the rear wall in the upstanding position on either side of the bed.

It is common that a pickup truck have installed from the factory or as an aftermarket accessory the cover 3 which spans between the front wall 17, the side walls 19 and 20, and the rear wall 18 so as to close the pickup truck bed 1 at its top which is otherwise open. Thus, the cover 3 with the floor 16 and walls 17-20 of the truck bed collectively define an enclosed container 21 at the bed 1. The cover 3 may be a tonneau cover, for example comprising a plurality of foldable panels like that more clearly shown in FIG. 1 or comprising a single solid body spanning the length of the bed which is liftable on gas struts or comprising a rollable fabric material, or a camper shell which is also referred to in industry as a cap.

Regardless of specific type of cover, at or adjacent its peripheral edges 22 the cover 3 meets the walls 17-20 of the bed at a plurality of seams 24 about the bed 1 at which the cover and the bed are contiguous. A seal formed between the cover 3 and the bed 1 at the seams 24 is substantially airtight and thus ambient air surrounding the truck bed is inhibited from passing into the enclosed container 21 at the seams.

However, there are at the bed 1 a plurality of existing openings like those indicated at 25 which are communicable with an outside of the bed and corresponding passageways trailing from these openings which are communicable with an inside of the bed within the walls 17-20. The existing openings 25 include for example drainage openings which are typically located near the front of the bed, and tie-down openings defining locations where straps may be secured to the bed. Furthermore, the existing openings include openings at locations along a seam between adjacent walls/floor of the bed, for example at the seam between one of the side walls 19 or 20 and the rear wall 18; at a seam between one of the side walls 19, 20 and the front wall 17 which are typically spot welded together; or between one of the walls of the bed and the floor 16. Thus the ambient air is able to pass from the outside of the bed through these existing openings 25 to the inside thereof even though the bed 1 is closed at its top by the cover 20.

In order to inhibit passage of the ambient air into the enclosed container, which along with it brings particulate debris such as dust into the enclosed container, there is provided the pressurization system 100 which pressurizes the covered truck bed 1 so as to minimize or substantially eliminate a pressure gradient otherwise present between the outside of the covered bed and the inside thereof by which the particulate debris is drawn into the enclosed container at the existing openings like those indicated at 25.

The pressurization system 100 includes an opening 102 formed in the front wall 17 of the bed at a location which corresponds to location of the vent 14 in the rear of the cabin 5 so that the opening 102 registers in location with the vent 14.

Furthermore, the system 100 includes a duct 104 which is disposed externally of the cabin 5. The duct 104 comprises a first opening 105 at the cabin 5 where the duct is communicated with the vent 14, and a second opening 106 at the bed where the duct is communicated with the bed opening 102. The first opening 105 is arranged, for example by being sized and shaped, to enclose the vent 14 around a periphery of the vent such that the air which is discharged therefrom can be captured by the duct. A passageway 108 extends linearly from the first opening 105 to the second opening 106. Thus, the discharged air exiting the cabin through the vent 14 is conveyed through the passageway 108 and into the covered bed 1.

As such, it will be appreciated that the duct 104 is not directly communicated with the ventilator unit 13 of the HVAC system.

It also will be appreciated that the first and second openings 105, 106 of the duct may be also regarded as respective 'open ends' of the duct. Additionally, the passageway 108 has uniform cross-section from the first opening to the second opening.

The duct 104 comprises a body of compressible material 110 having a thickness T substantially equal to a distance between the cabin and the bed, that is more specifically between the rear of the cabin and the front wall of the bed, so that the compressible material can be sandwiched therebetween. As such, the body of compressible material has a first face 111A arranged in abutment with an outer surface 5A of the rear of the cabin which is around the vent 14, and opposite thereto a second face 111B arranged in butting engagement with an outer surface 17A of the bed at the front wall 17. The duct is able to withstand relative movement between the cabin 5 and the bed 1 observed during transport as they are not affixed to one another but each supported independently of one another on the frame 4. Furthermore, the material 110 is resilient so that upon compression due to movement of the bed relative to the cabin the material 110 is able to return to its substantially uncompressed state in which the duct is when the truck is for example at rest on a flat surface.

In the illustrated arrangement the body of compressible material 110 comprises foam arranged in a fashion so that the foam is resiliently compressible. The foam material forms an annulus defining the passageway 108. The annulus has a width W from the passageway 108 to an outer surface of the duct.

Further to its compressibility, in the illustrated arrangement the material of the duct is thermally insulating. As such, the duct may maintain a temperature of the air which is discharged through the vent 14 as it is guided to the bed 1.

Where the duct is communicated with the bed there is provided a perforated grill 113 which closes the opening 102 in the truck bed so as to prevent passage of contents stored in the bed into the passageway 108 while allowing the air to flow into the bed. The grill 113 comprises a screen 115 locating perforations or openings 116 of the grill and a rim 118 which is supported on the screen forming an annulus which encloses an area of the screen to which the perforations are localized.

The rim 118 thus projects transversely to a plane of the screen, which is planar, and has a peripheral outer face 119A and a peripheral inner face 119B which co-terminate at a distal end 120 of the rim that is spaced from a face 122 of the screen that is arranged for butting engagement with an inner surface 17B of the bed at the front wall. The rim 118 locates the duct 104 in position between the cabin 5 and the bed 1 so that the duct is supported in fixed position with the passageway 108 communicating the vent in the rear of the cabin and the opening in the bed. As such, the rim extends to a position such that the distal end is horizontally beyond the outer face 17A of the bed at the front wall and thus in a space S or gap between the cabin and the bed. Furthermore, in the illustrated arrangement the duct is received at the peripheral outer face 119A of the rim which is in contact with a surface of the passageway 108 thereby locating the duct and its passageway at the proper position. Therefore, no additional materials such as adhesives are used that would otherwise secure the duct to at least one of the cabin and the bed in order to hold it in place therebetween.

The grill 113 is fastened to the bed at its screen, which in the illustrated arranged is achieved by passing fasteners such as screws through an outer edge portion of the screen 115 adjacent peripheral edges thereof and into the front wall 17 of the bed.

Furthermore, the grill 113 includes a plurality of elongated ridges 125 located in spaced relation each to the next and projecting perpendicularly transversely from a face 126 of the grill screen 115 that is exposed at the inside of the bed 1. In the illustrated arrangement each ridge 125 spans linearly across a full height of the grill 113 from a bottom to a top thereof and such that the respective ridge is in parallel condition to the next. In other arrangements, the ridges may be formed for example by a peripheral lip extending about a perimeter of an outer peripheral edge 128 of the screen and projecting transversely from the exposed face 126.

Figure 5:
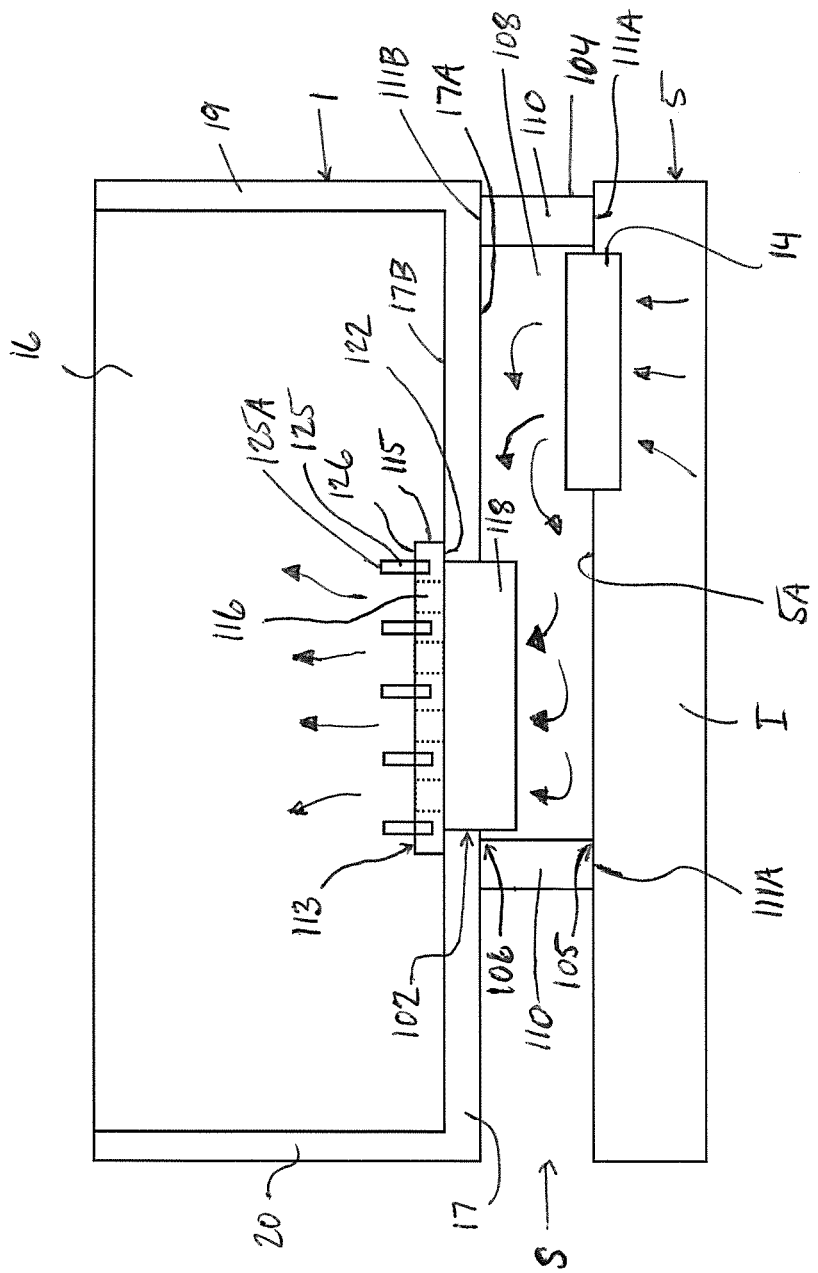
FIG. 5 illustrates a portion of the pickup truck with the cover, like that shown in FIG. 1, in horizontal cross-section including another arrangement of pressurization system according to the present invention. Some components are illustrated schematically for clarity of illustration.

As more clearly shown for example in FIG. 5, in the illustrated arrangement the ridges 125 are connected to the screen 115 such that an end of the respective ridge which is at or proximal the screen is recessed into the screen from the exposed face 126 thereof. This may provide a stronger connection between the respective ridge and the screen.

The ridges 125 may act to strengthen the grill so that upon sudden braking during transport collision of the contents in the bed with the grill does not break the grill with the possibility that the contents may then pass through the opening 102. Additionally, the ridges 125 act as spacers defining a plane at distal ends 125A of the ridges that is spaced from the exposed face 126 of the screen so that the perforations 116 in the screen cannot be obstructed by contents stored in the bed.

It will be appreciated that in some arrangements the vent 14 of the pickup truck may be located closer to one side of the cabin 5 than to the other while it may still be desirable to locate the truck bed opening 102 centrally of the front wall 17 between either side thereof. Therefore it will be appreciated that the location of the opening 102 may not register with that of the vent 14 at the rear of the cabin. In such an arrangement, the duct 104 may be sized such that a width of the passageway 108 spans from a side of the vent proximal a closest side of the cabin (for example, in FIG. 5 this side of the vent would be the left side which is proximal the left side of the cabin) to a side of the rim 118 distal to the vent (for example, in FIG. 5 this distal side of the rim is a right side thereof). Thus, the air discharged from the cabin 5 is guided across a portion of the width of the space S from one side to the next so as to be guided between the outer surface 17A of the bed at the front wall and the outer surface 5A of the cabin at its rear.

Figure 6:
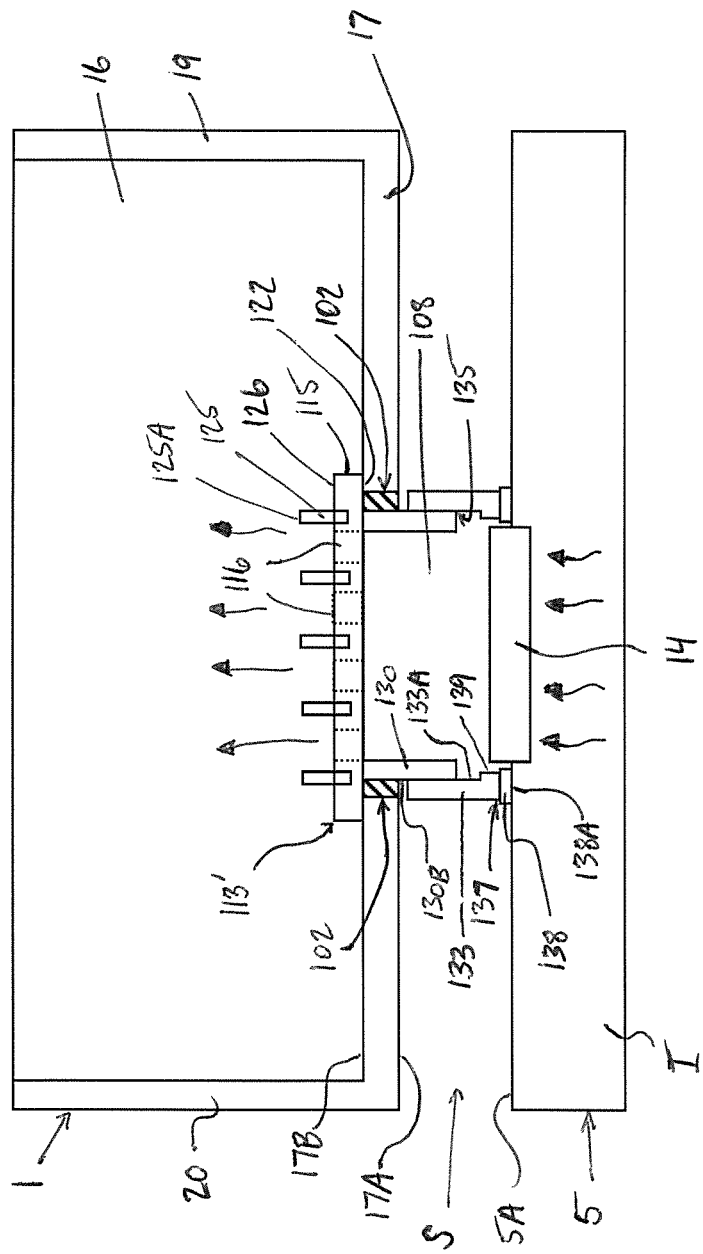
FIG. 6 illustrates a portion of the pickup truck with the cover, like that shown in FIG. 1, in horizontal cross-section including a third arrangement of pressurization system according to the present invention. Some components are illustrated schematically for clarity of illustration.
Figure 7:
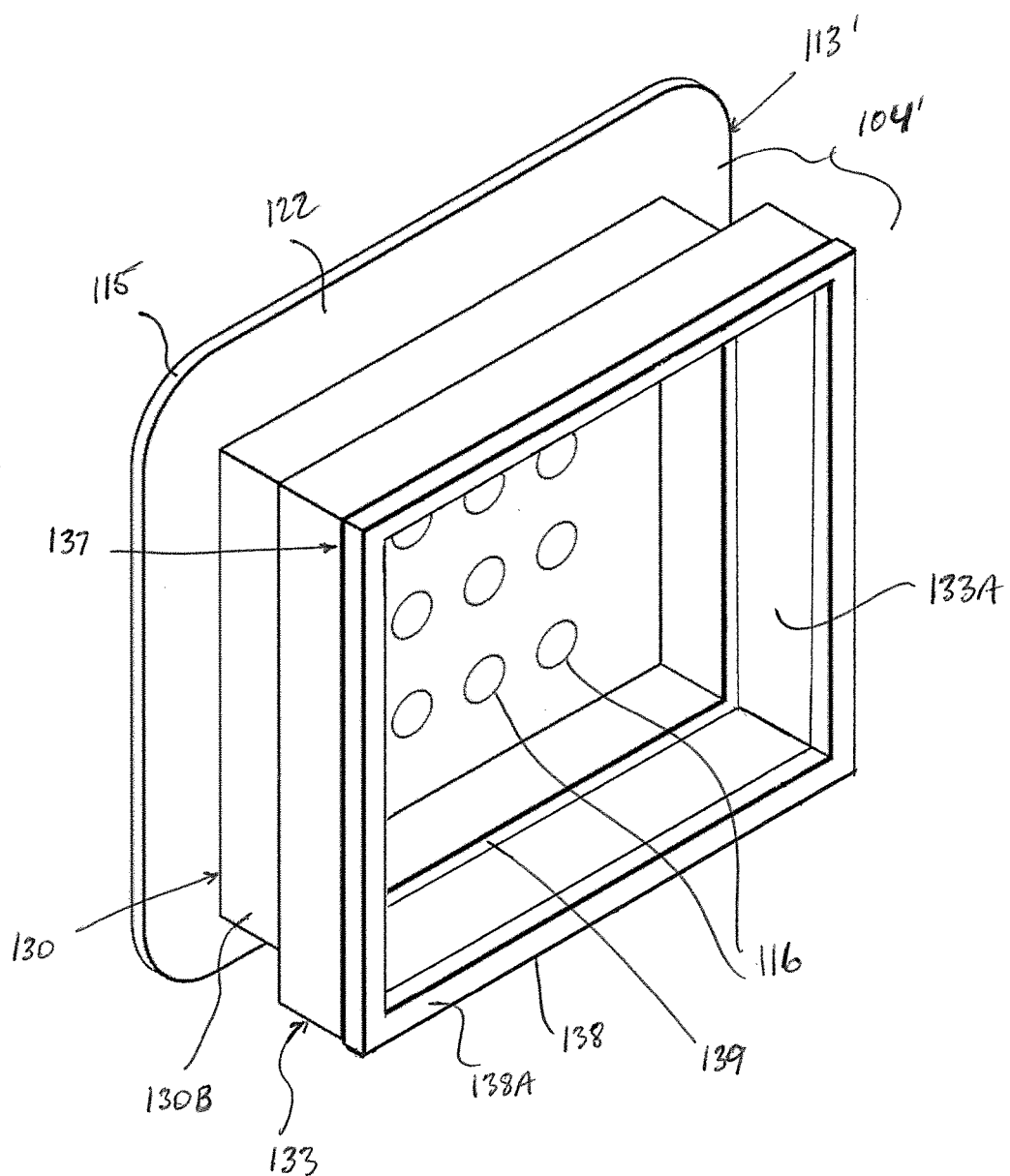
FIG. 7 illustrates a grill and duct of the third arrangement of the pressurization system in perspective view.

In another arrangement of the pressurization system that is more clearly shown in FIGS. 6 and 7, the duct 104' comprises a first fixed portion 130 which is fixedly coupled to the grill 113', for example by being formed unitarily therewith as a single part of an injection moulding process, and a second extendable portion 133 which is movable relative to the first portion 130 in a telescoping fashion. According to this arrangement the duct has a passageway which is adjustable in length so as to span a distance between the cabin 5 and the bed 1 on various pickup trucks. It will be appreciated that particularly when the pressurization system is installed as an aftermarket accessory so as to retrofit the pickup truck, the distance between the bed 1 and the cabin 5 may deviate from specifications of the pickup truck at the time of manufacture, for example as with use of the truck the bed becomes bent. Therefore, adjustability of duct length may fit various pickup trucks when the bed-to-cabin distance may not be uniform from one pickup truck of the same make to the next.

Turning to the second arrangement in more detail, both the first portion 130 and the second portion 133 are tubular in shape, for example having square rectangular cross-section, and made from a rigid material such as plastic. The selected rigid material is weather-resistant so that the duct is resistant to damage or substantial deterioration due to exposure to the "elements" including moisture and cold temperatures.

In the second arrangement as illustrated, the second extendable portion 133 is received circumferentially over the first fixed portion in a tight moving fit therewith. There is thus formed an interface 135 between the two portions of the duct where they are mated one with the other. At this interface 135 in the illustrated arrangement there is provided a friction sliding fit between an inner surface 133A of the second portion and an outer surface 130B of the first portion so that the second portion is movable relative to the first portion only with substantial force exerted thereon to displace same (force which may be applied by a human). The second portion 133 may remain in fixed relation to the first portion by the friction at the interface 135 alone. Alternatively, the second portion may be fixed in position relative to the first portion with fasteners or pins arranged to pass through a thickness of each of the portions of the duct. In other arrangements, instead of the friction sliding fit there may be provided a series or set of cooperating teeth on each of the first portion and the second portion with a ratchet mechanism arranged to adjust and set position of the second portion relative to the fixed first portion but which acts to resist retraction of the second extendable portion 133, that is movement thereof towards the grill, once the position of the second portion is set.

The second extendable portion 133 at its distal end 137 relative to the first fixed portion 130 supports a compressible seal 138 with a face 138A arranged for butting engagement with the outer surface 5A at the rear of the cabin. The seal extends circumferentially about a full perimeter of the distal end 137, which may comprise a flange 139 at which the seal is supported. The seal 138 is for example made of foam. In this arrangement a thickness of the seal is significantly smaller than the thickness of the duct in the arrangement illustrated more clearly for example in FIG. 2 or 5.

Thus in this arrangement the duct 104' is supported in fixed relation to the bed 1 via the grill 113' which is directly fastened to the bed, as the duct is affixed to the grill. However, an end portion of the duct, that is the distal end 137 with the seal 138, remains detached from the cabin 5 but in butting engagement therewith allowing the distal end of the duct to be shifted across the rear of the cabin during movement of the bed relative to the cabin, particularly in side-to-side directions, while maintaining communication with the vent 14 during same.

It will be appreciated that in this arrangement the grill 113' only includes screen 115 without rim 118.

When installing the kit as an aftermarket accessory for retrofitting a pickup truck, a first step of the installation process is locating the vent 14 at the rear of the cabin. When the vent is located then a location for the bed opening 102 may be selected, whether to register with the vent location or be offset therefrom, and the opening 102 is subsequently formed in the bed 1.

Next, the grill and the duct are generally concurrently arranged in their respective position at the bed or between the bed and the cabin. In the case of the first arrangement with the grill which has the rim and the wholly distinct duct which is entirely made of the compressible material, the duct is arranged in the space S such that the first opening 105 of the duct is registered with the vent and the second opening 106 is registered with the bed opening 102, and then the grill may be installed by fastening to the bed so that the rim 118 supports the duct 104.

In the case of the second arrangement with the duct 104' which is extendable, when the bed opening is formed then the unitary grill and duct piece may be arranged in an extended position in which the distal end 137 of the second portion is spaced outwardly away from an end 139 of the first portion which is distal to the grill. For example the duct may be arranged in a fully extended position in which the duct has its largest length. Then, the duct is passed through the bed opening 102 and the distal end 137 with the seal 138 is pressed against the outer surface 5A of the rear of the cabin 5 so as to cause the second portion 133 to retract as the screen 115 of the grill is displaced towards the inner surface 17B of the bed at the front wall. When the inner face 122 of the screen is in abutment with the inner bed surface 17B, the duct will have retracted to the proper length at which the duct spans between the bed opening 102 and the vent 14. The duct 104' may then be removed from within the opening 102, the second portion 133 fixed in position to the first portion so as to maintain the proper length of the passageway 108, and then the duct may be reinserted through the bed opening and the grill 113' fastened to the bed. It will be appreciated that instead of fixing exactly in the position in which the second portion 133 was removed from the opening 102, the second portion 133 may be slightly extended away from the first portion 130 such that upon fastening the grill 113' to the bed 1 the seal 138 is compressed so as that the duct is arranged more tightly against the outer surface 5A of the rear of the cabin.

Additionally, it will be appreciated that on pickup trucks having more than one vent, a single duct of the pressurization system (feeding a single bed opening 102 in the bed 1) sized so as to have a first opening which is communicable with both vent simultaneously may thus duct air discharged from a plurality of vents into the covered bed. As such, the discharged air from more than one vent may be picked off by the pressurization system so as to pressurize the enclosed container at the bed if more air is needed therefor.

In use, the ventilator unit 13 is switched on so as to generate a stream of the forced air, shown at arrows A1, into the cabin 5 from ambient air drawn into the HVAC system 12. Thus, in this mode the ventilator unit is not drawing from air inside the cabin so as to recirculate that air which is already inside the cabin but rather is pumping additional air into same.

In this manner, the air which is circulating about the interior I of the cabin is eventually forced through the vent 14 so as to be discharged from the cabin 5. The duct 104 thus channels the discharged air across the space S between the cabin and the bed 1 through the opening 102 in the front wall 17 of the bed into the covered bed, also referred to as the enclosed container 21 herein, thereby pressurizing same. If there is an excess of air in the covered truck bed then this will escape at through the existing openings like those at 25.

As such, during transport when the pickup truck 2 is moving such that the ambient air around the truck is normally conduced to pass into the covered bed 1, such passage of the ambient air is prevented when the truck bed is pressurized using the pressurization system 100.

Since various modifications can be made in my invention as herein above described, and many apparently widely different embodiments of same made, it is intended that all matter contained in the accompanying specification shall be interpreted as illustrative only and not in a limiting sense.

The invention claimed is:
1. A pickup truck comprising:
a frame having front and rear ends that is arranged for rolling movement across a support surface;
a cabin arranged for housing occupants that is supported on the frame;
a ventilator unit feeding an interior of the cabin with forced air;
the cabin including a vent at a rear of the cabin by which the interior of the cabin is communicated with an exterior of the cabin so that the forced air inside the cabin is permitted to discharge from the cabin to the exterior thereof;

a truck bed supported on the frame rearwardly of the cabin with a front wall at a front end of the bed, rear wall at a rear end of the bed, and side walls spanning therebetween on either side of the bed;

a cover spanning between the front wall, the side walls, and the rear wall so as to close a top of the truck bed thus defining an enclosed container at the truck bed;

the truck bed having existing openings through which ambient air is able to pass into the enclosed container;

a pressurization system for pressurizing the enclosed container so as to prevent passage of the ambient air into the enclosed container comprising:

an opening in the bed;

a duct disposed externally of the cabin extending from the vent in the rear of the cabin to the opening in the bed for guiding the air discharged from the cabin through the vent into the enclosed container.

2. The pickup truck according to claim 1 wherein the duct is disposed between the rear of the cabin and the front wall of the bed where the opening in the bed is located.

3. The pickup truck according to claim 1 wherein the opening of the bed is located in the front wall thereof in a manner corresponding with location of the vent in the rear of the cabin such that the duct extends linearly rearwardly from the vent to the bed opening.

4. The pickup truck according to claim 1 wherein the duct comprises compressible material extending from a position at the rear of the cabin towards the front wall of the bed so as to maintain communication with the vent during movement of the bed relative to the cabin.

5. The pickup truck according to claim 1 wherein the duct comprises a first face with an opening communicating a passageway of the duct with the vent of the cabin and a second face with an opening communicating the passageway with the opening in the bed, the first face of the duct being in butting engagement with an outer surface of the cabin and the second face being in butting engagement with an outer surface of the bed.

6. The pickup truck according to claim 1 wherein the duct is supported in fixed relation to the bed with an end portion of the duct in butting engagement with the rear of the cabin so as to maintain communication with the vent during movement of the bed relative to the cabin.

7. The pickup truck according to claim 1 wherein the duct comprises thermally insulating material.

8. The pickup truck according to claim 1 wherein the vent in the rear cabin is enclosed around its periphery by an open end of the duct.

9. The pickup truck according to claim 1 further including a perforated grill closing the opening in the bed, the grill including a screen locating perforations of the grill and a rim supported on the screen that locates the duct in position between the vent in the rear of the cabin and the opening in the bed.

10. The pickup truck according to claim 9 wherein the rim has a peripheral outer face and a peripheral inner face which co-terminate at a distal end of the rim that is spaced from the screen, and the duct is received at the outer face of the rim.

11. The pickup truck according to claim 1 further including a perforated grill closing the opening in the bed, the grill including a plurality of elongated ridges each which project transversely from a face of the grill that is exposed at an inside of the bed so as to resist obstruction of perforations of the grill by contents in the bed.

12. A kit for pressurizing a bed of a pickup truck that is closed with a cover, the pickup truck including:

a frame having front and rear ends that is arranged for rolling movement across a support surface;

a cabin arranged for housing occupants that is supported on the frame rearwardly of the compartment;

a ventilator unit feeding an interior of the cabin with forced air;

the cabin including a vent at a rear of the cabin by which the interior of the cabin is communicated with an exterior of the cabin so that the forced air inside the cabin is permitted to discharge from the cabin to the exterior thereof;

the truck bed supported on the frame rearwardly of the cabin with a front wall at a front end of the bed, rear wall at a rear end of the bed, and side walls spanning therebetween on either side of the bed;

a cover spanning between the front wall, the side walls, and the rear wall so as to close a top of the truck bed thus defining an enclosed container at the truck bed;

the truck bed having existing openings through which ambient air is able to pass into the enclosed container;

the kit comprising:

a duct to be located externally of the cabin arranged to extend from the vent in the rear of the cabin to an opening formed in the bed for guiding the air discharged from the cabin through the vent into the enclosed container;

whereby the enclosed container is pressurized by the air discharged from the cabin such that ambient air is prevented from passing into the enclosed container.

13. The kit according to claim 12 wherein the duct is arranged to be disposed between the rear of the cabin and the front wall of the bed where the opening in the bed is located.

14. The kit according to claim 12 wherein the duct is arranged to extend linearly rearwardly to the opening which is formed in the bed at a location corresponding to that of the vent in the rear of the cabin.

15. The kit according to claim 12 wherein the duct comprises compressible material arranged to extend from a position at the rear of the cabin towards the front wall of the bed.

16. The kit according to claim 12 wherein the duct comprises a first face with an opening arranged for communicating a passageway of the duct with the vent of the cabin and a second face with an opening arranged for communicating the passageway with the opening in the bed, the first face of the duct being arranged for butting engagement with an outer surface of the cabin and the second face being for butting engagement with an outer surface of the bed.

17. The kit according to claim 12 further including a perforated grill arranged to close the opening formed in the bed, the grill including a screen locating perforations of the grill and a rim supported on the screen that locates the duct in position between the vent in the rear of the cabin and the opening formed in the bed.

18. The kit according to claim 17 wherein the rim has a peripheral outer face and a peripheral inner face which co-terminate at a distal end of the rim that is spaced from the screen, and the duct is arranged to be received at the outer face of the rim.

19. The kit according to claim 12 further including a perforated grill arranged to close the opening formed in the bed, the grill including a plurality of elongated ridges each which project transversely from a face of the grill that is arranged to be exposed at an inside of the bed so as to resist obstruction of perforations of the grill by contents in the bed.

20. The kit according to claim 12 wherein the duct comprises a first portion arranged to be held in fixed relation to the opening in the bed and a second portion which is movable relative to the first portion such that the passageway of the duct is adjustable in length between the opening in the bed and the vent at the rear of the cabin, and the second portion at its end distal to the first portion supporting a compressible seal arranged for butting engagement with the rear of the cabin.

\* \* \* \* \*